United States Patent
Tendyra et al.

(10) Patent No.: US 11,697,953 B2
(45) Date of Patent: Jul. 11, 2023

(54) DOOR FOR SEPARATING TWO ENVIRONMENTS WITH DIFFERENT PRESSURES

(71) Applicant: AIRBUS HELICOPTERS DEUTSCHLAND GMBH, Donauworth (DE)

(72) Inventors: Thomas Tendyra, Schwenningen (DE); Stefan Becker, Donauworth (DE); Torsten Queck, Biberbach (DE); Kai Simon, Donauworth (DE); Christian Ferber, Roegling (DE); Christoph Merkel, Sontheim an der Brenz (DE)

(73) Assignee: AIRBUS HELICOPTERS DEUTSCHLAND GMBH, Donauworth (DE)

(*) Notice: Subject to any disclaimer, the term of this patent is extended or adjusted under 35 U.S.C. 154(b) by 47 days.

(21) Appl. No.: 17/445,511

(22) Filed: Aug. 20, 2021

(65) Prior Publication Data
US 2022/0136290 A1    May 5, 2022

(30) Foreign Application Priority Data
Nov. 4, 2020    (EP) .................................... 20400019

(51) Int. Cl.
*B64C 1/14* (2006.01)
*E05B 83/02* (2014.01)
(Continued)

(52) U.S. Cl.
CPC ............ *E05B 83/02* (2013.01); *B64C 1/1461* (2013.01); *E05C 9/08* (2013.01); *E05C 9/22* (2013.01)

(58) Field of Classification Search
CPC ......... E05B 83/02; B64C 1/14; B64C 1/1461; B64C 1/143; B64C 1/1423; E05C 9/08; E05C 9/22
See application file for complete search history.

(56) References Cited

U.S. PATENT DOCUMENTS 3,791,073 A * 2/1974 Baker ................... B64C 1/1407
                                                    49/40
9,937,996 B2 * 4/2018 Joern .................... B64C 1/1423
(Continued)

FOREIGN PATENT DOCUMENTS

EP    2007621 A1    12/2008
EP    3168138 B1     5/2017
(Continued)

OTHER PUBLICATIONS

European Search Report for European Application No. EP 20400019. 4, Completed by the European Patent Office, dated Apr. 15, 2021, 5 pages.
(Continued)

*Primary Examiner* — Assres H Woldemaryam
(74) *Attorney, Agent, or Firm* — Brooks Kushman P.C.

(57) ABSTRACT

A door that is adapted to separating two environments with different pressures and to an aircraft with such a door. The door may include a door leaf, a door frame having a door stop and a roller, and an actuating system having a latch element and an inward-moving drive system. The inward-moving drive system may include a puller shaft and a puller that is non-rotatably attached to the puller shaft. The puller may include a guide rail that moves along the roller during a rotation of the puller such that the puller moves the door leaf in direction of the first environment thereby disengaging the latch element from the door stop.

20 Claims, 11 Drawing Sheets

(51) Int. Cl.
    *E05C 9/08*        (2006.01)
    *E05C 9/22*        (2006.01)

(56)           References Cited

U.S. PATENT DOCUMENTS 10,240,389 B2 *   3/2019   Do ............................ E06B 5/12
    10,871,013 B2 *  12/2020   Schwab .................. E05B 85/24
 2006/0006285 A1 *   1/2006   Puschmann ............... B64C 1/14
                                                                 244/129.1
 2009/0113954 A1     5/2009   De Resseguier et al.
 2010/0024305 A1     2/2010   Kim et al.
 2017/0129585 A1 *   5/2017   Erben .................. E05B 17/2034
 2018/0134366 A1 *   5/2018   Merkel ..................... B64G 1/60
 2019/0210708 A1 *   7/2019   Gorgoglione ............. B64C 1/32
 2020/0079489 A1     3/2020   Lieven et al.
 2022/0081941 A1     3/2022   Samuelson

FOREIGN PATENT DOCUMENTS

EP          3275779 A1       1/2018
 EP          3323709 A1 *     5/2018   ............... B64C 1/14
 EP          3620369 A1       3/2020
 FR          3018064 A1       9/2015
 WO       2007107861 A1       9/2007

OTHER PUBLICATIONS

Certification Specifications and Acceptable Means of Compliance for Large Aeroplanes CS-25 Amendment 25 European Union Aviation Saftey Agency. Jun. 24, 2020. 1165 pages.

* cited by examiner

DOOR FOR SEPARATING TWO ENVIRONMENTS WITH DIFFERENT PRESSURES

CROSS-REFERENCE TO RELATED APPLICATIONS

This application claims priority to European patent application No. EP 20400019.4 filed on Nov. 4, 2020, the disclosure of which is incorporated in its entirety by reference herein.

TECHNICAL FIELD

The present embodiments relate to a door that is adapted to separating two environments with different pressures. The present embodiments further relate to an aircraft with at least one door that is adapted to separating two environments with different air pressures.

BACKGROUND

Doors that are adapted to separating two environments with different pressures can be found in various different applications. Examples for such applications include doors in aircrafts, spacecrafts, pressure chambers, submarines, etc. When such doors are used in aircrafts, they usually fulfill the following major functions: they close the aircrafts in operation for maintaining a required internal pressure therein, they contribute to carrying flight loads in corresponding lower deck cargo compartments, they allow passengers and crew to enter and exit the aircrafts, and they allow external access to the corresponding lower aircraft compartments.

Most state-of-the-art doors of pressurized aircrafts are plug doors. Those plug doors are designed to seal themselves by using the pressure difference between the pressurized cabin and the surrounding atmosphere of the aircraft. The higher pressure on the inside of the aircraft forces the door leaf, which is often wedge-shaped, into the door frame, thereby sealing the door and preventing it from being opened until the pressure difference is small enough.

The opening sequence of a plug door often starts with an inward movement followed by or combined with a lifting of the door leaf in order to achieve clearance of the door stops in the door frame for a subsequent movement to open the door. In the closed position, the door leaf usually floats in forward-backward and up-down direction on a sliding surface between a door stop in the door frame and a latch element that is in connection with the door leaf.

Some aircraft doors may have door latching systems that do not require a door lifting or lowering movement during the door opening sequence. Instead, those doors are often prevented from opening by a sliding bolt or a drive pin system. However, such sliding pin systems are sensitive to freezing when engaged, and thus, increase the risk of a blockage of the door.

Moreover, some of these doors may no longer satisfy the airworthiness standards of CS25.783(d) (cf. https://www.easa.europa.eu/document-library/certification-specifications/cs-25-amendment-25) of latching and locking which require that "the latch shall provide the latch function also when disconnected from its operating mechanism in pressurized and unpressurized flight", and "latches and their operating mechanism must be designed so that under all flight and ground loading conditions there is no torque or force tending to unlatch the latches".

Document EP 3 275 779 A1 describes a load transfer interface for a vehicle door that comprises an outer skin and at least one beam that is connected to the outer skin, wherein the outer skin and the at least one beam define a vehicle door plane, the load transfer interface comprising at least one door stop fitting that is provided to transfer pressure loads from the vehicle door to an associated vehicle structural frame, the at least one door stop fitting being provided for rotation in an associated rotation plane, wherein the associated rotation plane is at least approximately parallel to the vehicle door plane. The door stopper has a ball part that is connected to a disc-shaped part, whereby the ball part is accommodated in the at least one door stop fitting and sealed therein by means of a suitable gasket. The document further describes an aircraft cabin door having such a load transfer interface, as well as an aircraft having such an aircraft cabin door.

Document EP2007621 or US2009113954 describes a system having at least one locking member mounted on the door or on the doorframe, located along at least one of the edges of the door or of the doorframe, this locking member being able to move between a closed position, in which it bears against a corresponding bearing region of the doorframe or of the door, a what is called "inward opening" intermediate position, which it occupies during the opening sequence of the door, in which it bears respectively against the doorframe or the door so as to move the door toward the interior of the aircraft cabin, and an open position, in which it is completely disengaged from said corresponding bearing region, thus permitting the outward movement of the door relative to the doorframe without an upward or downward vertical movement. The system further comprises means for actuating each locking member between said closed and open positions and means for locking each locking member in the closed position.

Document EP 3 168 138 B1 describes a door assembly, particularly for doors of passenger aircraft. The door assembly includes a door frame, a door having a door body hingedly installed in the door frame, at least one hooking pintle attached to the door frame or an edge of the door body extending along a pintle axis, and at least one door latch connected to an edge of the door body or the door frame, respectively, the door latch having a substantially C-shaped latch body configured to rotate around an axis parallel to the pintle axis of the hooking pintle. The door assembly further includes a bistable latch and hook mechanism configured to catch the door latch in hooking engagement with the hooking pintle and to retain the door latch in a direction perpendicular to the door body in an overcenter position.

Document EP 3 620 369 A1 describes a plurality of movable stop members that are provided at the periphery of the door, and intended to be supported on stop means complementary provided on the door frame. A door control device is configured to bring the door from its closed position to an intermediate withdrawal position by moving it towards the interior of the compartment, and a device for controlling the stop means is configured so as to allow, when the door occupies its intermediate position of withdrawal, to cause a displacement of the movable stop members from a deployed locking position, to a retracted unlocking position allowing a movement of the door outwards through the opening of the fuselage. The documents US2010024305 and FR3018064 were also cited.

The above described doors may no longer satisfy the airworthiness standards of CS25.783(d) of latching and locking which require that "the latch shall provide the latch function also when disconnected from its operating mechanism in pressurized and unpressurized flight", and "latches and their operating mechanism must be designed so that under all flight and ground loading conditions there is no torque or force tending to unlatch the latches".

SUMMARY

It is, therefore, an objective to provide a new door that overcomes the above shortcomings of prior art solutions. In particular, the new door should be adapted to separating two environments with different pressures and satisfy the requirements of airworthiness standards of CS25.783(d). Moreover, it is an objective that the new door can be opened without a lifting or lowering movement. Furthermore, it is an objective to provide an aircraft with such a new door that is adapted to separate two environments with different air pressures.

More specifically, a door that is adapted to separating a first environment with a first pressure and a second environment with a second pressure that is smaller than the first pressure may comprise a door frame; a door leaf that is adapted to closing the door frame; and an actuating system that is mounted to the door leaf. The door frame may comprise a door stop that protrudes from the door frame, and a roller that protrudes from the door frame. The actuating system may comprise a latch element that is adapted to engaging with the door stop to latch the door leaf, wherein the latch element is pushed against the door stop when the door is in a latched state and the first pressure is greater than the second pressure; and an inward-moving drive system. The inward-moving drive system may comprise a puller shaft that is drivable to rotate around an associated puller shaft rotation axis, and a puller that is non-rotatably attached to the puller shaft. The puller may comprise a guide rail that moves along the roller during a rotation of the puller in response to a rotation of the puller shaft around the puller shaft rotation axis such that the puller moves the door leaf in direction of the first environment thereby disengaging the latch element from the door stop and enabling a transition of the door from the latched to an unlatched state, and a stopper nose that is pushed against the roller when the door is in the latched state and the first pressure is smaller than or equal to the second pressure.

The door may be opened without an upward or lifting movement. Thereby, the cut-out of the fuselage may be as small as possible. Moreover, due to the elimination of the lifting movement, any lift-assisting and weight-compensating components such as a forced spring system may be omitted. In fact, such lift-assisting and weight-compensating components are usually part of the latching system and assist with the lifting of the door which includes the door leaf, the actuating system, and the emergency slide.

The described actuating system includes a laterally arranged rotating latching and locking system at each load-interface point. In order to enable latching, the actuating system still requires an inward-moving drive system to enable latching in all points and to clear the fixed fuselages side stops. When the door is closed and in a latched position, the latch design blocks any opening without an inward movement.

The described door has a reduced weight and lower cost compared to prior art doors due to the smallest possible fuselage side cut-out. Furthermore, no lift mechanism and/or weight compensation is required on the door. A plurality of moveable latches (e.g., 10, 12, 14, or 16) may be needed to maintain the door in a closed position.

The door sealing concept is simplified on the door side and on the fuselage side compared to prior art solutions because there is no door lift movement. The door installation requires less of a rigging effort, because a door lifting position is no longer given. If desired, connecting links can be fixed on the door structure and simplified compared to prior art doors.

Moreover, any handle forces or activation forces that are provided by an electrical system are only related to latching, locking, and inward movement of the door. Furthermore, a door side cover plate that closes the upper gap which is usually provided for lift space is not needed.

According to one aspect, the stopper nose has an angled stop surface that that is in contact with the roller when the door is in the latched state and the first pressure is smaller than or equal to the second pressure.

According to one aspect, the guide rail disengages from the roller when the door reaches the unlatched state.

According to one aspect, the guide rail has a protrusion, and the puller moves the door leaf in direction of the first environment when the roller moves over the protrusion.

According to one aspect, the guide rail has a wave-shaped profile such that the puller moves the door leaf in direction of the first environment when the roller moves over the wave-shaped profile.

According to one aspect, the door further comprises a rubber seal that is mounted to the contour of the door leaf and prevents an equalization between the first and second pressures.

According to one aspect, the actuating system further comprises a lock element that is adapted to securing the latch element such that the door is in a secured and locked state.

According to one aspect, the lock element further comprises a lock lever; and a lock shaft that is drivable to rotate around an associated lock shaft rotation axis, wherein the lock lever is non-rotatably attached to the lock shaft and performs a rotation around the lock shaft rotation axis in response to the lock shaft performing a rotation around the lock shaft rotation axis.

According to one aspect, the actuating system further comprises a latch shaft that is drivable to rotate around an associated latch shaft rotation axis, wherein the latch element is non-rotatably attached to the latch shaft and performs a rotation around the latch shaft rotation axis in response to the latch shaft performing a rotation around the latch shaft rotation axis.

According to one aspect, the actuating system further comprises at least one lock counterpart that interacts with the lock lever to limit the rotation of the latch element around the latch shaft rotation axis.

According to one aspect, the actuating system further comprises a central drive shaft that is drivable to rotate around an associated central drive shaft rotation axis; a latch operating mechanism that connects the latch shaft with the central drive shaft; and a lock operating mechanism that connects the lock shaft with the central drive shaft.

According to one aspect, the latch operating mechanism further comprises first and second drive levers that are connected to the central drive shaft and drivable to rotate around associated first and second drive lever rotation axes, wherein the first and second drive levers rotate in a counterclockwise direction in response to the central drive shaft rotating in a clockwise direction.

According to one aspect, the latch operating mechanism further comprises first and second rods that are fixedly attached to the respective first and second drive levers, wherein the first and second rods are pulled towards the central drive shaft in response to the first and second drive levers rotating in the counterclockwise direction.

According to one aspect, the latch element further comprises a door stop screw that is adjustable in its axial direction and interacts with the door stop when the door is in the latched state.

Moreover, an aircraft may comprise at least one door as described above.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
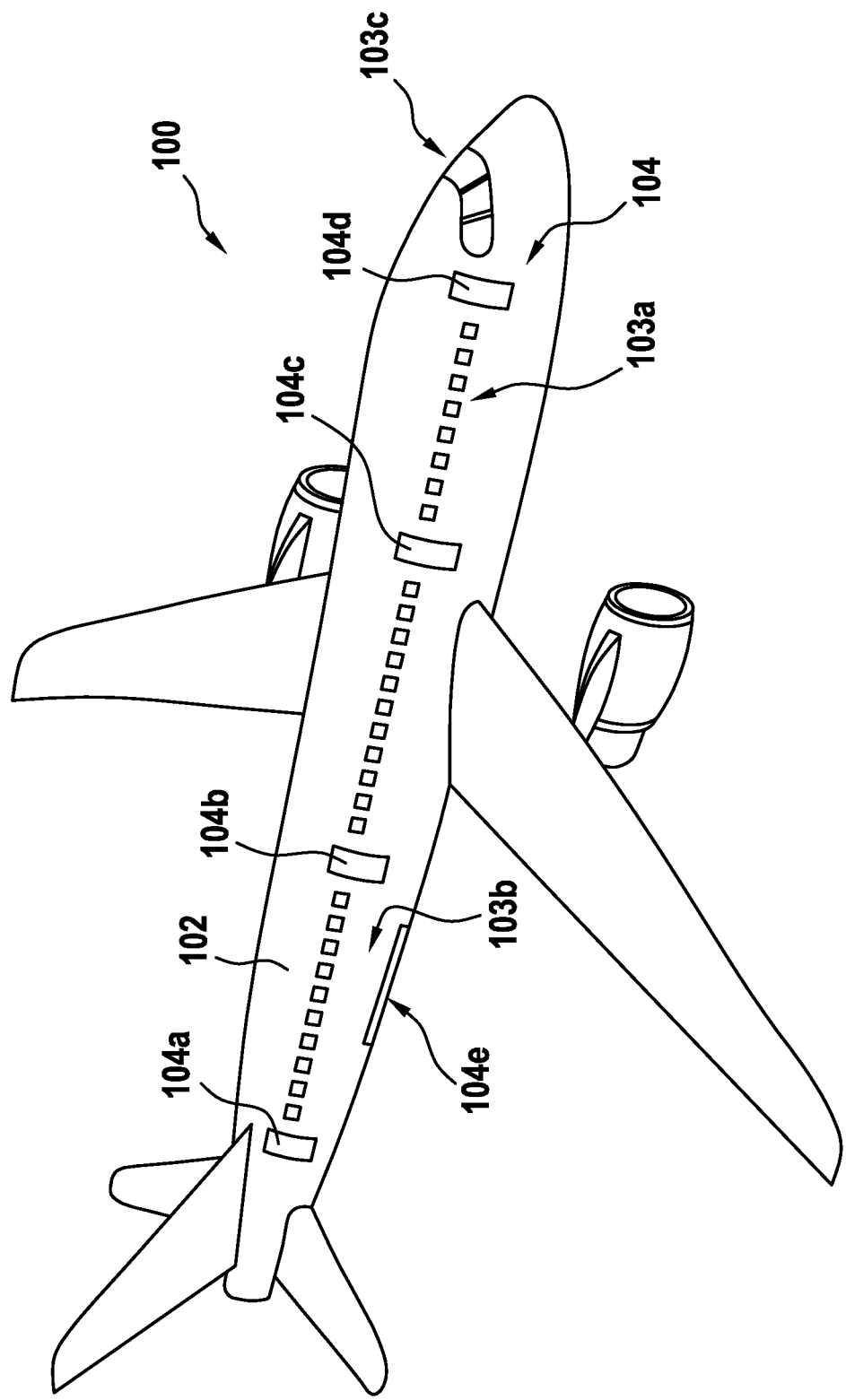
FIG. 1 shows a perspective view of an illustrative aircraft having several aircraft doors that are adapted to separating two environments with different pressures in accordance with some embodiments.

FIG. 1 shows an aircraft 100 with an aircraft airframe 102, which is sometimes also referred to as fuselage 102. Illustratively, the aircraft 100 comprises a passenger cabin 103a, a cargo deck 103b, and a flight deck or cockpit 103c. If desired, the aircraft 100 is accessible via a plurality of aircraft doors 104, which exemplarily comprises several cabin access doors 104a, 104b, 104c, and 104d, as well as one or more cargo deck access doors 104e. By way of example, the passenger cabin 103a and the flight deck 103c are accessible via the cabin access doors 104a, 104b, 104c and 104d, and the cargo deck 103b is accessible via the one or more cargo deck access doors 104e.

The plurality of aircraft doors 104 may be adapted to close the aircraft airframe 102 (i.e., fuselage 102 of the aircraft 100) in a fluid-tight manner. If desired, at least one, and preferably each one, of the plurality of aircraft doors 104 is associated with at least one emergency slide.

If desired, aircraft 100 may include at least one door 200 as described below with reference to FIG. 2 to FIG. 9B. In other words, one or more of the plurality of aircraft doors 104 may be a door 200 as described below with reference to FIG. 2 to FIG. 9B.

One or more of the plurality of aircraft doors 104 may include a door frame with a door stop and a door leaf with a latch element. During a flight of aircraft 100, the air pressure outside the aircraft 100 may be smaller than the air pressure inside the cabin 103a and/or the cargo deck 103b. The difference between the air pressure inside the cabin 103a and/or the cargo deck 103b and the air pressure outside the aircraft 100 may put a pressure on the door leaf such that the latch element is pushed against the door stop.

As shown in FIG. 1, aircraft 100 is embodied by an airplane. However, the present embodiments are not limited to airplanes. Instead, any door that separates two environments with different pressures is likewise contemplated. By way of example, the present door may alternatively be applied to spacecrafts, pressure chambers, submarines, and so on.

Consequently, the present door is not limited to aircraft doors, but can likewise be applied to any arbitrary door that separates two environments with different pressures. However, for purposes of illustration, the present door is hereinafter described with respect to aircraft doors.

Figure 2:
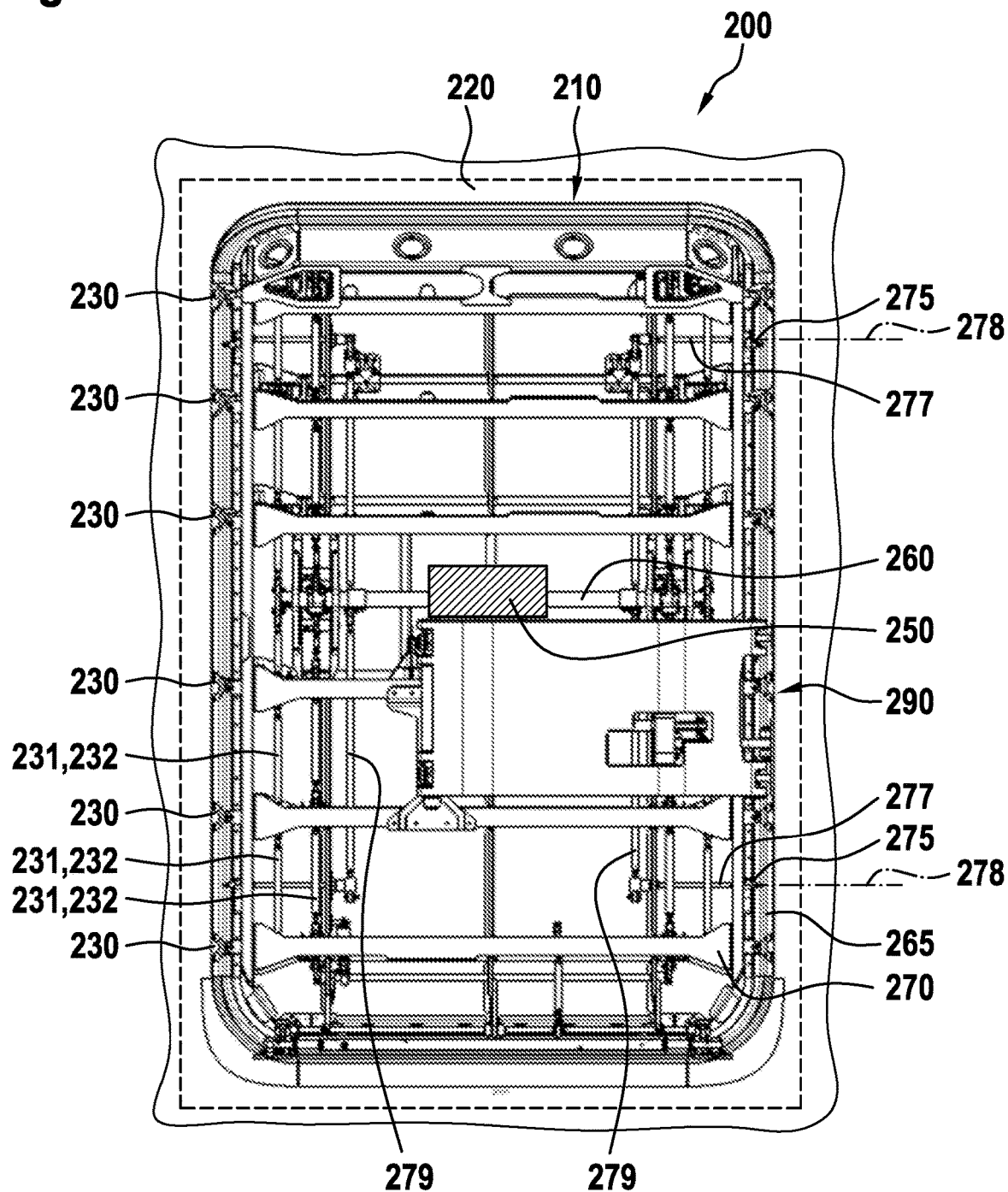
FIG. 2 is a diagram of an illustrative door with a door leaf that is adapted to closing a door frame in accordance with some embodiments.

FIG. 2 is a diagram of an illustrative door 200 with a door leaf 210 that is adapted to closing a door frame 220, whereby the door 200 is adapted to separating two environments with different pressures in accordance with some embodiments.

Door 200 may include a rubber seal 265. Rubber seal 265 may be mounted to the contour of the door leaf 210 and prevent an equalization between the pressures of the two environments. If desired, rubber seal 265 may be mounted to the contour of the door leaf 210 and/or to the contour of the door frame 220 to prevent an equalization between the pressures of the two environments.

Door leaf 210 may have beams 270 that reinforce the structure of door leaf 210. For example, beams 270 may carry loads on door leaf 210.

Beams 270 may reinforce the structure of door leaf 210 horizontally between a left side and a right side. Alternatively, beams 270 may reinforce the structure of door leaf 210 vertically between an upper side and a lower side. If desired, beams 270 may reinforce the structure of door leaf 210 horizontally and vertically or in any other direction (e.g., between the upper left and the lower right side of door leaf 210 and/or between the upper right and the lower left side of door leaf 210).

FIG. 2 also shows an illustrative actuating system 290 that is mounted to the door leaf 210. Actuating system 290 includes a latch element 230. As shown in FIG. 2, actuating system 290 may include a plurality of latch elements 230.

Illustratively, latch element 230 is adapted to engaging with a counterpart that is mounted to the door frame 220. As an example, latch element 230 is adapted to engaging with a door stop that protrudes from the door frame 220. Latch element 230 is pushed against the door stop when the door 200 is in a latched state.

Illustratively, actuating system 290 may include a lock element. Actuating system 290 may include a plurality of lock elements, if desired. For example, actuating system 290 may include a lock element for every latch element 230. If desired, each latch element 230 may have an associated lock element that is adapted to securing the respective latch element 230. By way of example, the lock element may secure the latch element 230 when the door leaf 210 closes the associated door frame 220 such that the door 200 is in a secured and locked state.

Actuating system 290 may have a central drive shaft 260 for operating the latch elements 230 and/or the lock elements. As an example, actuating system 290 may include a latch operating mechanism that connects at least a portion of the latch elements 230 with the central drive shaft 260. If desired, the latch operating mechanism may include rods 231, 232 that connect at least some of the latch elements 230 with the central drive shaft 260. As another example, actuating system 290 may include a lock operating mechanism that connects at least a portion of the lock elements with the central drive shaft 260.

Illustratively, actuating system 290 may include a drive shaft actuating system 250. The drive shaft actuating system 250 may rotate the central drive shaft 260 in a clockwise or a counter-clockwise direction. Thus, the drive shaft actuating system 250 may move at least a portion of the latch elements 230 via the central drive shaft 260 and the latch operating mechanism and at least a portion of the lock elements via the central drive shaft 260 and the lock operating mechanism.

As an example, actuating the drive shaft actuating system 250 may move a latch element 230 and a lock element such that the door 200 transitions from a secured and locked state to an unlocked and unlatched state. As another example, actuating the drive shaft actuating system 250 may move a latch element 230 and a lock element such that the door 200 transitions from an unlocked and unlatched state to a secured and locked state, whereby the door leaf 210 is in a closed position when the door 200 is in the secured and locked state.

The door leaf 210 is movable from the closed position to an opened position or from an opened position to the closed position when the door 200 is in the unlocked and unlatched state. Illustratively, drive shaft actuating system 250 may include an electric motor and/or a lever that act on central drive shaft 260.

As an example, consider the scenario in which door 200 is adapted to separating a first environment with a first pressure and a second environment with a second pressure that is smaller than the first pressure (e.g., one of the plurality of aircraft doors 104 of FIG. 1 in which the first environment is the inside of the fuselage 102 and the second environment is the outside of the fuselage 102). In this scenario, moving the door leaf 210 from the closed position to an opened position may involve a movement of the door leaf 210 towards the first environment to disengage the latch elements 230 from the associated door stops of the door frame 220.

Illustratively, actuating system 290 includes a drive system that performs the movement of the door leaf 210 towards the first environment with the greater pressure to disengage the latch elements form the associated door stops. The drive system that performs the movement of the door leaf 210 towards the first environment with the greater pressure is hereinafter referred to as an inward-moving drive system 275 on the basis of an inward move that a door leaf of an airplane door would perform when moving the door leaf from the closed to an opened position due to the greater pressure on the inside of the airplane. If desired, the drive system that performs the movement of the door leaf 210 towards the first environment with the greater pressure may be an outward-moving drive system if the greater pressure is on the outside.

As shown in FIG. 2, inward-moving drive system 275 includes puller shaft 277. If desired, inward-moving drive system 275 may include a plurality of puller shafts 277. Puller shaft 277 is drivable to rotate around an associated puller shaft rotation axis 278. If desired, one or more rods 279 may connect puller shafts 277 with central drive shaft 260.

Figure 3A:
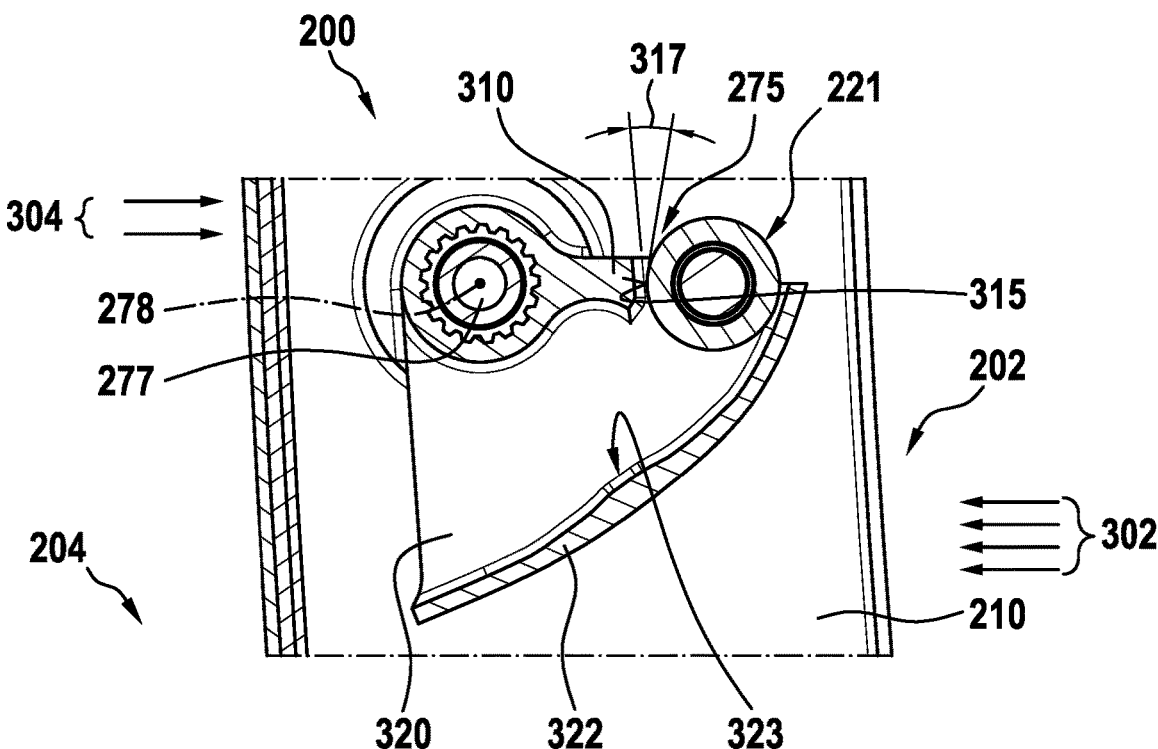
FIG. 3A is a diagram of an illustrative door with an illustrative inward-moving drive system that includes a guide rail with a protrusion in accordance with some embodiments.

FIG. 3A is a diagram of an illustrative door 200 with an illustrative inward-moving drive system 275 and a roller 221 that protrudes from the door frame of the door 200 in accordance with some embodiments. Door 200 may be adapted to separating a first environment 202 with a first pressure 302 from a second environment 204 with a second pressure 304 that is smaller than the first pressure 302.

As shown in FIG. 3A, inward-moving drive system 275 includes a puller shaft 277 that is drivable to rotate around an associated puller shaft rotation axis 278. Illustratively, inward-moving drive system 275 includes a puller 320 that is non-rotatably attached to the puller shaft 277.

By way of example, the puller 320 includes a stopper nose 310. The stopper nose 310 may be pushed against the roller 221 when the door 200 is in the latched state. Thus, stopper nose 310 together with roller 221 prevent a movement of door leaf 210 towards the first environment 202 when the first pressure 302 is smaller than or equal to the second pressure 304.

If desired, the stopper nose 310 may have an angled stop surface 315. For example, the angled stop surface 315 may be angled at a predetermined angle 317. The angled stop surface 315 may be in contact with the roller 221 when the door 200 is in the latched state and the first pressure 302 is smaller than or equal to the second pressure 304. Thereby, the angled stop surface 315 may prevent an opening rotation of the puller shaft 277 when the door 200 is moving unintentionally in direction of the first environment 202 when the door 200 is in the latched state. The angled stop surface 315 may ensure that no opening forces occur at the puller 320.

Illustratively, puller 320 may include a guide rail 322. The guide rail 322 may move along the roller 221 during a rotation of the puller 320 in response to a rotation of the puller shaft 277 around the puller shaft rotation axis 278. Thereby, the puller 320 may move the door leaf 210 in direction of the first environment 202. The move of the door leaf 210 in direction of the first environment may disengage the latch element from the door stop and enabling a transition of the door 200 from the latched to an unlatched state.

If desired, the guide rail 322 may have a protrusion 323 such that the puller 320 moves the door leaf 210 in direction of the first environment 202 when the roller 221 moves over the protrusion 323.

Figure 3B:
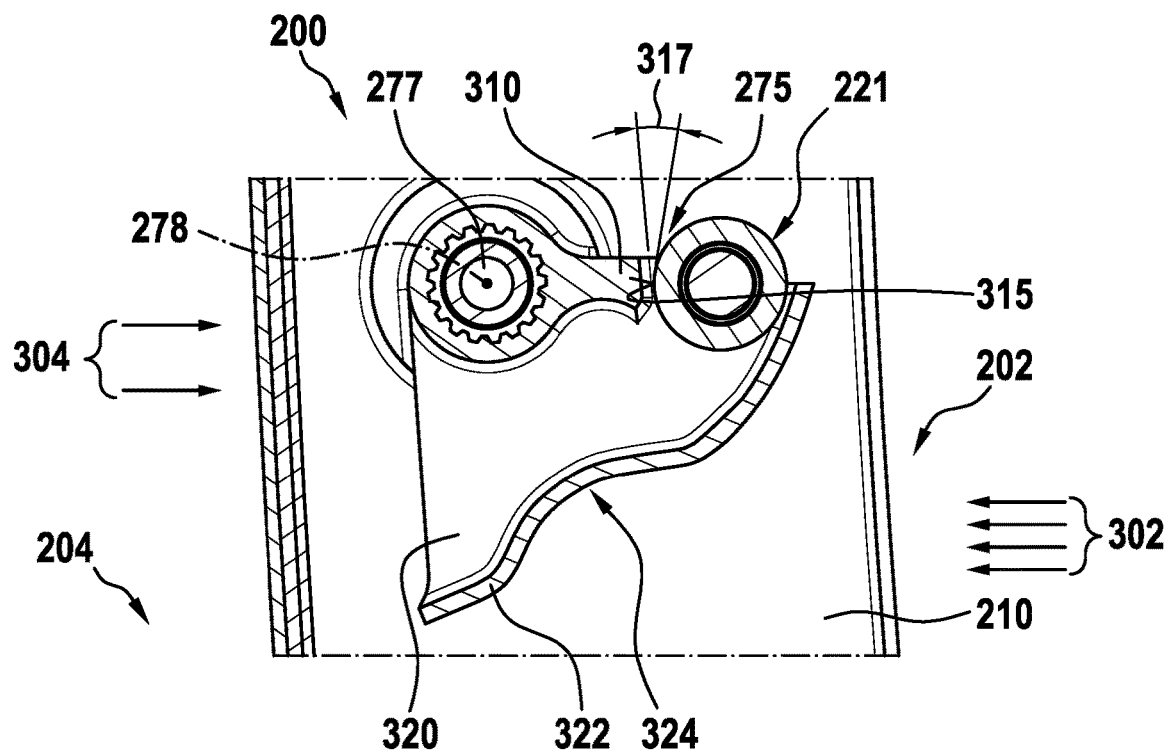
FIG. 3B is a diagram of an illustrative door with an illustrative inward-moving drive system that includes a guide rail with a wave-shaped profile in accordance with some embodiments.

FIG. 3B is a diagram of an illustrative door 200 with another illustrative inward-moving drive system 275 in accordance with some embodiments.

In contrast to the inward-moving drive system 275 of FIG. 3A, the inward-moving drive system 320 of FIG. 3B includes a guide rail 322 with a wave-shaped profile 324. Thus, the puller 320 moves the door leaf 210 in direction of the first environment 202 when the roller 221 moves over the wave-shaped profile 324, and, more particularly, when the roller 221 moves over the wave crest of the wave-shaped profile 324.

Figure 4A:
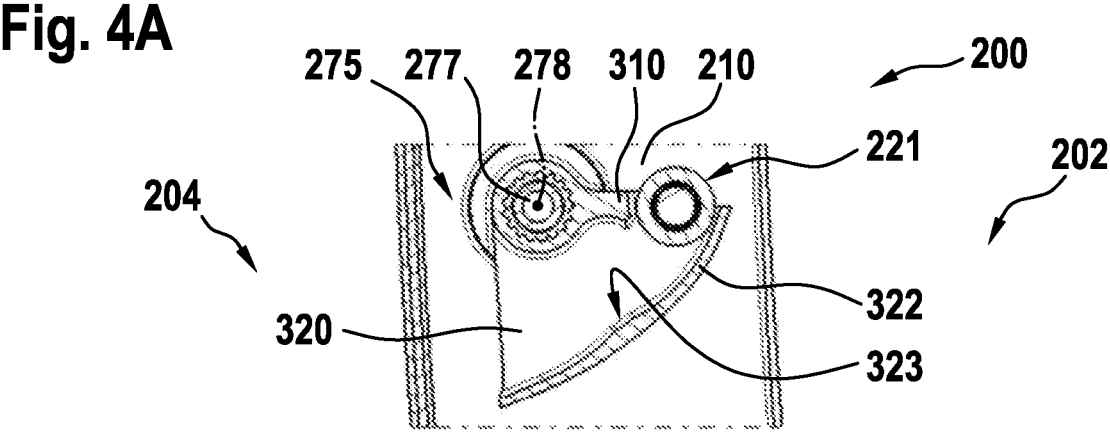
FIG. 4A is a diagram of an illustrative inward-moving drive system when the door is in a latched state in accordance with some embodiments.
Figure 4B:
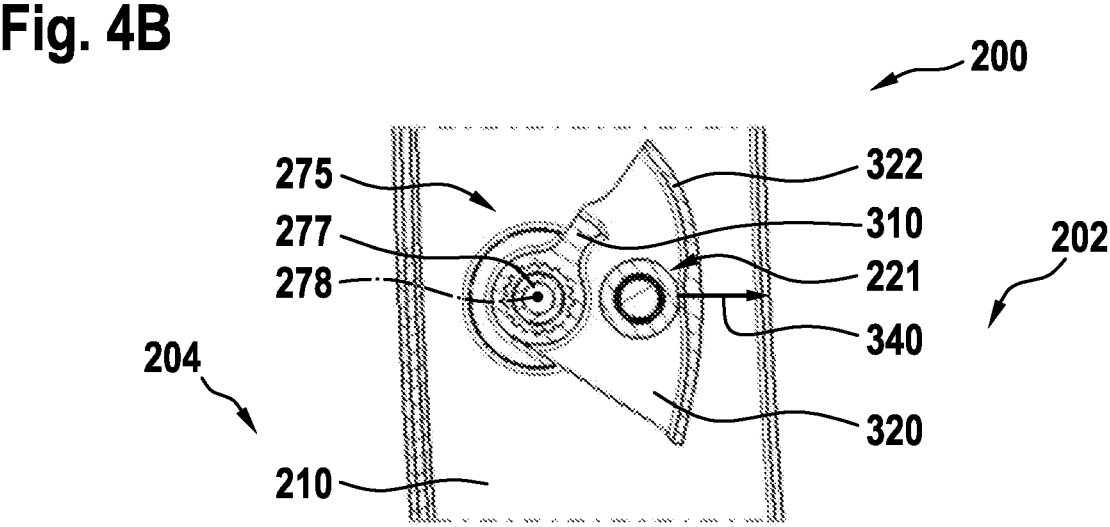
FIG. 4B is a diagram of the illustrative inward-moving drive system of FIG. 4A when the door is transitioning from the latched state to an unlatched state in accordance with some embodiments.
Figure 4C:
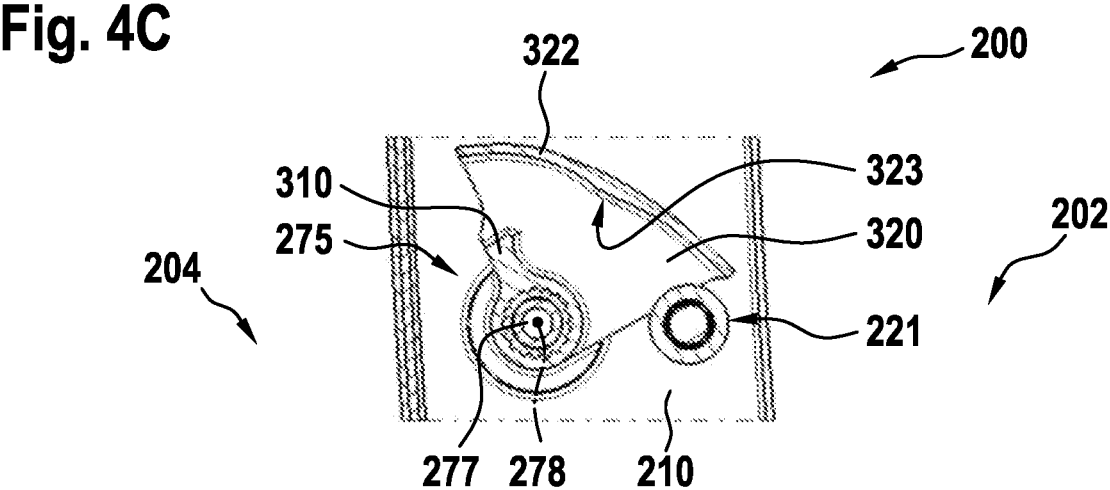
FIG. 4C is a diagram of the illustrative inward-moving drive system of FIG. 4A when the door is in the unlatched state in accordance with some embodiments.

FIG. 4A to FIG. 4C show the illustrative inward-moving drive system 275 of FIG. 3A when the door 200 is in a latched state, during a transition from the latched to an unlatched state, and in the unlatched state, respectively.

As shown in FIG. 4A, in the latched state, the latch elements of the actuating system of the door 200 are pushed by the greater pressure in the first environment 202 against the door stops of the door frame in direction of environment 204. In the latched state, when the pressure acting on the door 200 in the first environment 202 is smaller than or equal to the pressure acting on the door 200 in the second environment 204, the stopper nose 310 is pushed against the roller 221. Thereby, the stopper nose 310 may prevent that the door leaf 210 is moving in direction of the first environment 202.

For example, consider the scenario in which the door 200 is an airplane door such as airplane door 104 of FIG. 1. In this scenario, strong lateral winds on the outside 204 of the airplane may put a pressure on the door leaf 210 that is greater than the interior pressure inside the airplane 202, thereby pushing the door leaf 210 towards the cabin. The stopper nose 310 that is in contact with the roller 221 may prevent that the door leaf 210 is moved towards the cabin when the door is in the latched state.

FIG. 4B is a diagram of the illustrative inward-moving drive system of FIG. 4A when the door is transitioning from the latched state to an unlatched state in accordance with some embodiments.

Compared to FIG. 4A, the puller shaft 277 has performed a rotation in a counterclockwise direction from a viewer's perspective of FIG. 4A and FIG. 4B. The puller 320 that is non-rotatably attached to the puller shaft 277 and includes stopper nose 310 and guide rail 322 has rotated with the puller shaft 277 in the counterclockwise direction.

Thereby, the guide rail 322 gets in contact with the roller 221 and moves along the roller 221 during the rotation of the puller 320 in response to the rotation of the puller shaft 277 around the puller shaft rotation axis 278.

As shown in FIG. 4B, the guide rail 322 may have a protrusion 323. Illustratively, the roller 221 may be fixedly attached to and protrude from the door frame. When the roller 221 moves over the protrusion 323, the puller 320 may move 340 the door leaf 210 in direction of the first environment 202.

For example, consider the scenario in which the door 200 is an airplane door such as airplane door 104 of FIG. 1. In this scenario, the puller 320 may move the door leaf 210 inward towards the cabin. Thereby, the latch elements of the actuating system of the door 200 disengage from the door stops of the door frame such that the latch elements may be free to move. For example, the latch elements may be free to rotate away from the door stops.

FIG. 4C is a diagram of the illustrative inward-moving drive system of FIG. 4A and FIG. 4B when the door is in the unlatched state in accordance with some embodiments.

Compared to FIG. 4B, the puller shaft 277 has performed a further rotation in a counterclockwise direction from a viewer's perspective of FIG. 4B and FIG. 4C. The puller 320 that is non-rotatably attached to the puller shaft 277 and includes stopper nose 310 and guide rail 322 has further rotated with the puller shaft 277 in the counterclockwise direction.

Thereby, the guide rail 322 may have moved further along the roller 221 during the rotation of the puller 320 in response to the rotation of the puller shaft 277 around the puller shaft rotation axis 278.

Once, the protrusion has moved past the roller 221, the guide rail 322 may no longer be in contact with the roller 221, for example as a result of the door leaf's 210 move 340 towards the first environment as shown in FIG. 4B. If desired, the guide rail 322 may have a ramp instead of a protrusion 323 and the guide rail 322 may stay in contact with the roller 221 until the door 200 is in the completely unlatched state shown in FIG. 4C.

In the completely unlatched state, the guide rail 322 may be clear of the roller 221 such that the door leaf 210 may be moved freely towards the second environment 204.

For example, consider the scenario in which the door 200 is an airplane door such as airplane door 104 of FIG. 1. In this scenario, the guide rail 322 may be clear of the roller 221 such that the door leaf 210 may be pushed outwards during an opening movement of the door 200.

Figure 5:
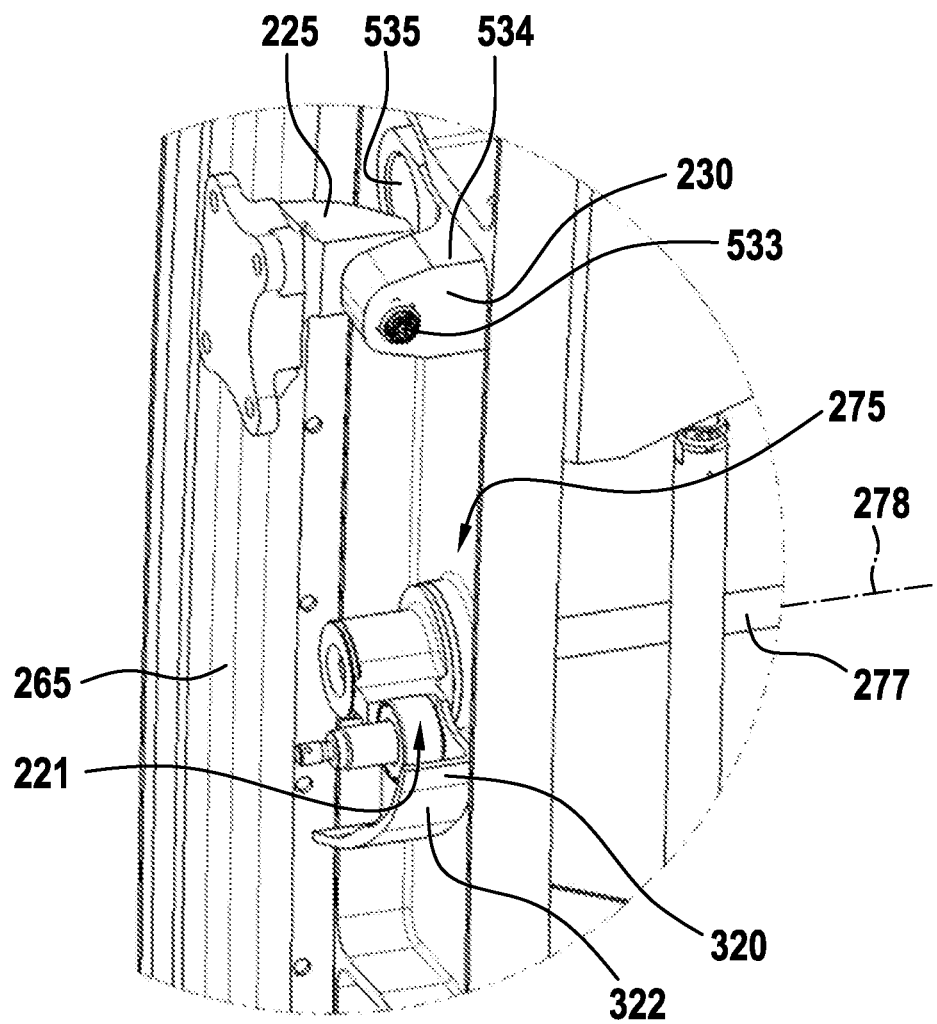
FIG. 5 is a perspective view of an illustrative door with an illustrative inward-moving drive system, a door stop, and a latch element in accordance with some embodiments.

FIG. 5 is a perspective view of an illustrative door 200 with an illustrative inward-moving drive system 275, a door stop 225 that protrudes from a door frame, and a latch element 230 in accordance with some embodiments. As shown in FIG. 5, the inward-moving drive system 275 may be in the same state as shown in FIG. 4A. Thus, the roller 221 is in contact with the guide rail 322, and the stopper nose 310 is pushed against the roller 221. Thereby, the stopper nose may prevent the door leaf 210 from moving inwards.

At the same time, the latch element 230 of the actuating system of the door 200 may be pushed against the door stop 225 and prevent the door leaf 210 from moving outwards. Thus, the door leaf may close the door frame, and the door 200 may be in the latched state.

Illustratively, the actuating system may include a latch shaft 535 that is drivable to rotate around an associated latch shaft rotation axis. The latch element 230 may be non-rotatably attached to the latch shaft 535. Thus, the latch element 230 may perform a rotation around the latch shaft rotation axis in response to the latch shaft 535 performing a rotation around the latch shaft rotation axis.

By way of example, the latch element 230 may have an L-shaped body 534. If desired, the body of the latch element 534 may be reinforced at the angle. Thereby, the reinforcement of the L-shaped body 534 may prevent bending or at least limit bending of the latch element 230 such that the latch element is able to resist high pressure loads that push the latch element 230 against the door stop 225.

Illustratively, the latch element 230 may include a door stop screw 533. The door stop screw 533 may be adjustable in its axial direction. If desired, the door stop screw 533 may interact with the door stop 225 when the door 200 is in the latched state.

Thus, through the adjustment of the door stop screw 533, the load distribution of the latch elements 230 on the door stops 225 may be equalized such that each latch element 230 puts the same pressure on the associated door stop 225 when the door is in the latched state and the door leaf is push towards the second environment. The door stop screw 533 is further illustrated in FIG. 7A and FIG. 7B.

Figure 6A:
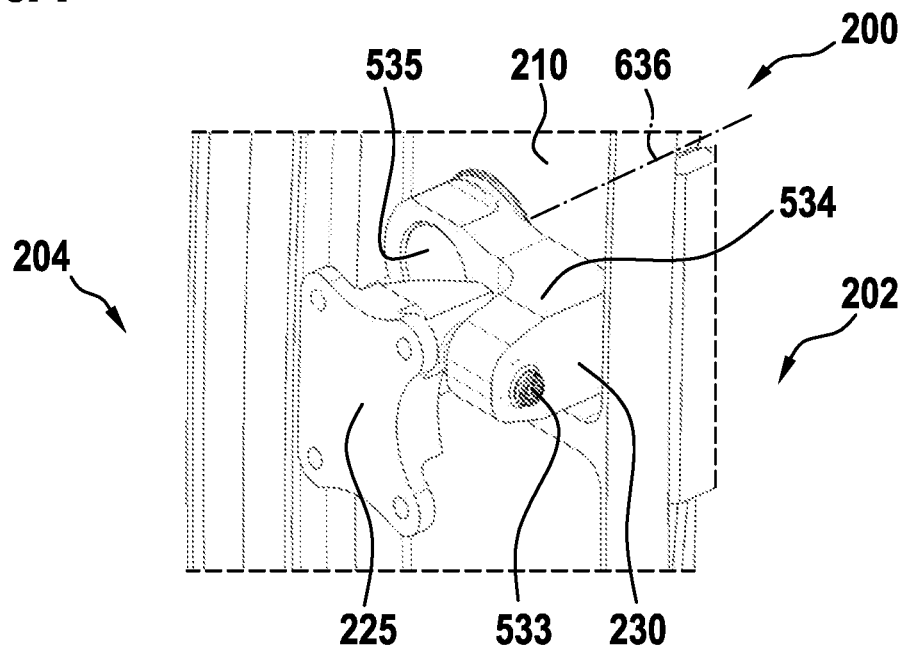
FIG. 6A is a diagram of the illustrative door with door stop and latch element of FIG. 5 when the door is in the latched state in accordance with some embodiments.

FIG. 6A is a diagram showing the illustrative door stop 225 and latch element 230 of FIG. 5 together with the latch shaft rotation axis 636 around which the latch shaft 535 rotates when moving the door 200 from a latched to an unlatched state.

Figure 6B:
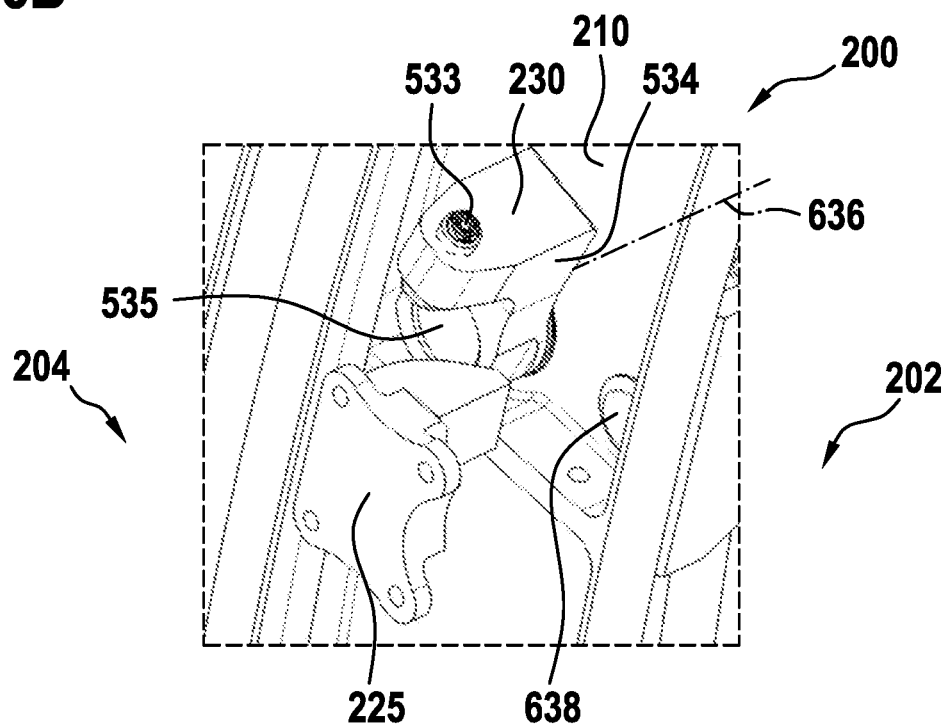
FIG. 6B is a diagram of the illustrative door with door stop and latch element of FIG. 5 when the door is in the unlatched state in accordance with some embodiments.

FIG. 6B is a diagram of the illustrative door 200 with door stop 225 and latch element 230 of FIG. 5 when the door 200 is in the unlatched state in accordance with some embodiments. Compared to FIG. 6A, the latch shaft 535 has performed a rotation around the latch shaft rotation axis 636, and the latch element 230 that is non-rotatably attached to the latch shaft 535 has also performed a rotation around the latch shaft rotation axis 636.

Through the rotation of the latch element 230, the latch element 230 is clear of the door stop 225. Thus, the door 200 is in an unlatched state, and the door leaf 210 may be pushed towards the second environment during an opening movement of the door leaf.

The latch element 230 of FIGS. 6A and 6B is shown with a door stop screw 533 that may interact with the door stop 225 when the door 200 is in the latched state.

By way of example, the latch element 230 may have an L-shaped body 534. If desired, the body of the latch element 534 may be reinforced at the angle. Thereby, the reinforcement of the L-shaped body 534 may prevent bending or at least limit bending of the latch element 230 such that the latch element is able to resist high pressure loads that push the latch element 230 against the door stop 225.

A latch support 638 may assist in preventing a bending of the body 534 of latch element 230. Latch support 638 may be attached to the structure of the door leaf (e.g., door leaf structure 270 of FIG. 2), if desired.

Figure 7A:
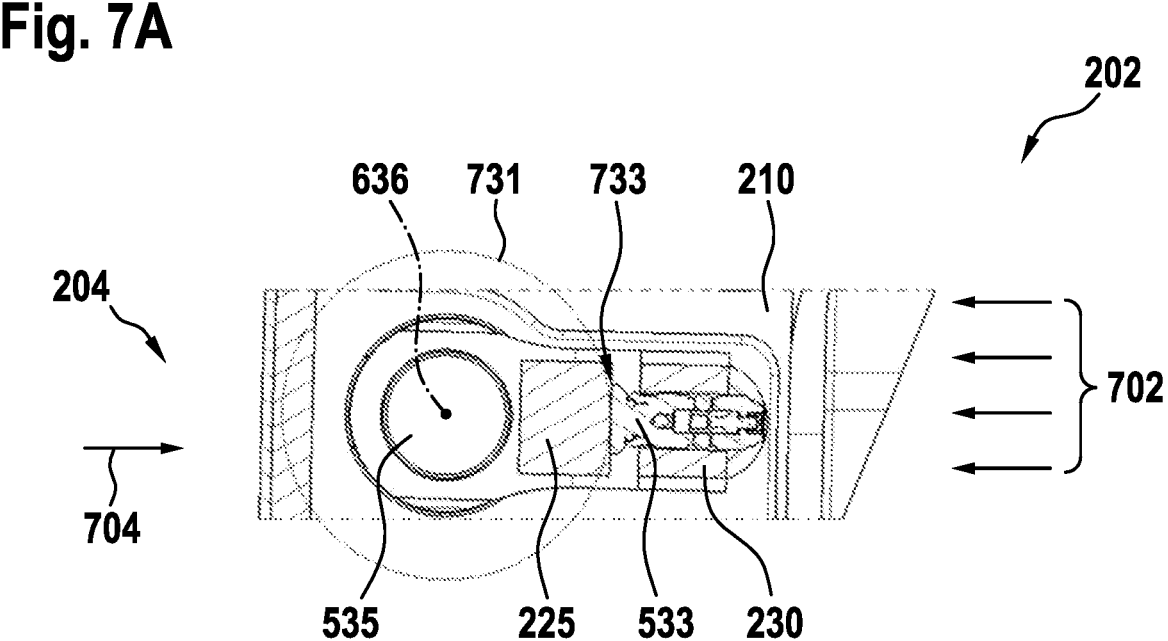
FIG. 7A is a diagram of an illustrative latch element that engages with a door stop to latch the door leaf in accordance with some embodiments.

FIG. 7A is a diagram of an illustrative latch element 230 with a door stop screw 533 that engages with a door stop 225 to latch the door leaf 210 such that the door is in a latched state in accordance with some embodiments. As shown in FIG. 7A, the first pressure 702 in the first environment 202 is greater than the second pressure 704 in the second environment 204. Thus, the pressure difference between first and second pressure 702, 704 may push latch element 230 against door stop 225.

Illustratively, the body of the latch element 230 may be threaded. The door stop screw 533 may be screwed into the threaded body of the latch element 230. Thus, the distance between the door stop 225 and the door stop screw 533, that occurs during the move of the door leaf 210 in direction of the first environment 202 as illustrated in FIG. 4B, may be adjustable.

For example, the door stop screw 533 may be adjusted relative to the body of latch element 230 such that the door stop screw 533 protrudes by a predetermined distance from the body of the latch element 230. In the scenario in which a plurality of the latch elements engage with associated door stops 225, the predetermined distance by which the door stop screws 533 protrude from the respective latch elements 230 may be selected individually for each latch element 230 of the plurality of latch elements such that each door stop screw 533 exerts the same pressure load on the associated door stop 225 when the door is in the latched state.

In the latched state, the shape of the door stop 225 that is in contact with the door stop screw 533 may prevent a rotation of the latch element 230 and thereby a rotation of the latch shaft 535 around the associated latch shaft rotation axis 636. In fact, a hypothetical rotation of the latch element 230 is illustrated by door stop screw rotation cycle 731, which shows that there is no clearance 733, and the latch element 230 is prevented from rotating in the latched state. Thus, the door cannot be opened.

Figure 7B:
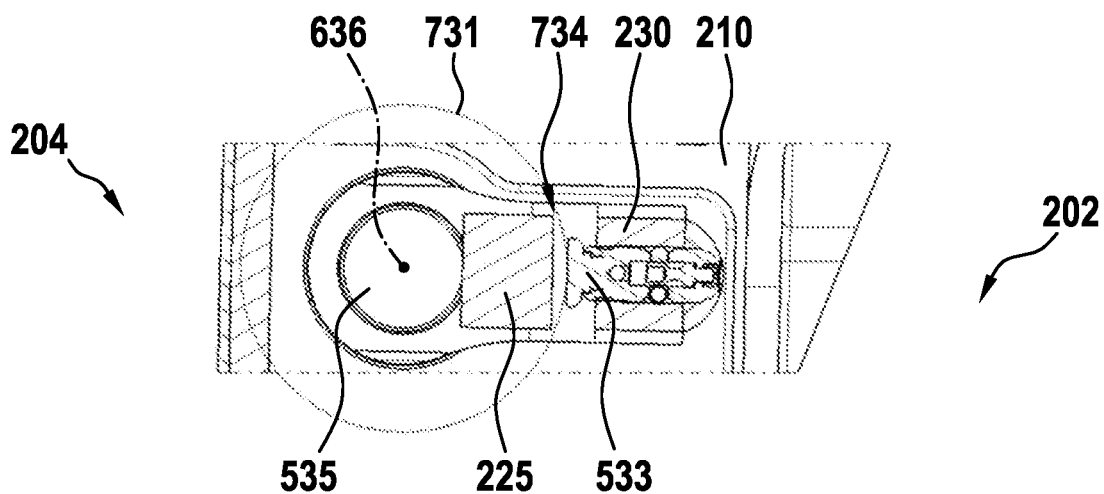
FIG. 7B is a diagram of the illustrative latch element of FIG. 7A that disengages from the door stop to unlatch the door leaf in accordance with some embodiments.

FIG. 7B is a diagram of the illustrative latch element 230 of FIG. 7A that has disengaged from the door stop 225 (e.g., when the puller of an associated inward-moving drive system moves the door leaf 210 in direction of the first environment 202 as illustrated in FIG. 4B). Thereby, the door transitions from the latched to an unlatched state.

In the unlatched state, the door stop screw 533 may rotate past the door stop 225 as illustrated by the door stop screw rotation cycle 731, which shows that there is clearance 734. Thus, the latch element 230 is free to rotate past the door stop 225 in response to the latch shaft 535 performing a rotation around the latch shaft rotation axis 636.

Figure 8A:
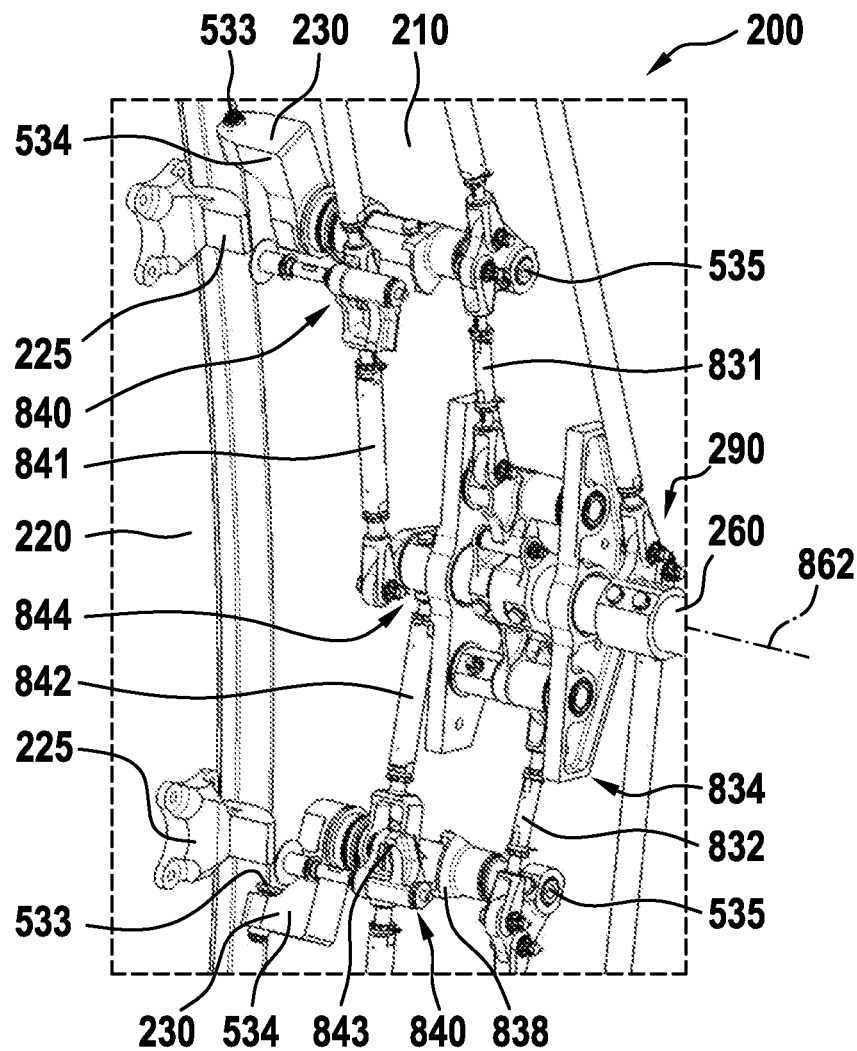
FIG. 8A is a diagram of an illustrative door with an illustrative actuating system when the door is in an unlatched state in accordance with some embodiments.

FIG. 8A is a diagram of an illustrative door 200 with an illustrative actuating system 290 when the door 200 is in an unlatched state in accordance with some embodiments.

The illustrative door 200 may include a door frame 220 with a door stop 225 that protrudes from the door frame 220, a door leaf 210 that is adapted to closing the door frame 220, and an actuating system 290 that is mounted to the door leaf 210.

Illustratively, the actuating system 290 may include a central drive shaft 260. The central drive shaft 260 may be drivable to rotate around an associated central drive shaft rotation axis 862. For example, a drive shaft actuating system, such as drive shaft actuating system 250 of FIG. 2, may drive central drive shaft 260 to rotate around central drive shaft rotation axis 862.

By way of example, the illustrative actuating system 290 may include a latch element 230 that is adapted to engaging with the door stop 225 to latch the door leaf 210. If desired, the latch element 230 may be pushed against the door stop 225 when the door 200 is in a latched state.

As shown in FIG. 8A, the illustrative door 200 is in an unlatched state, the door frame 220 has two door stops 225, and the illustrative actuating system 290 two latch elements 230 that are clear of the two door stops 225. If desired, the door frame 220 may have any number of door stops 225 and the illustrative actuating system 290 an associated number of latch elements 230. For example, the door frame 220 may have three, four, five, six, or more door stops 225 and the actuating system 290 accordingly three, four, five, six, or more latch elements 230.

The two door stops 225 and the associated latch elements 230 may be on opposing sides of the central drive shaft 260. For example, one door stop 225 and the associated latch element 230 may be above the central drive shaft 260 and another door stop 225 and the associated latch element 230 may be below the central drive shaft 260.

If desired, more than one door stop 225 together with associated latch elements 230 may be on the same side of the central drive shaft 260. As an example, two or more door stops 225 and the associated latch elements 230 may be above central drive shaft 260. As another example, two or more door stops 225 and the associated latch elements 230 may be below the central drive shaft 260. As yet another example, two or more door stops 225 and the associated latch elements 230 may be above and two or more door stops 225 and the associated latch elements 230 may be below central drive shaft 260.

By way of example, the actuating system 290 may include a latch operating mechanism 834. The latch operating mechanism 834 may connect the latch shaft 535 with the central drive shaft 260. For example, the latch operating mechanism 834 may include rods 831, 832 that connect latch shafts 535 with the central drive shaft 260.

Illustratively, actuating system 290 may include a lock element 840. Lock element 840 may be adapted to securing a latch element 230. If desired, actuating system 290 may include a plurality of latch elements 230, and each latch element 230 may be secured by a different lock element. Thus, as shown in FIG. 8A, two lock elements 840 may be adapted to securing the two latch elements 230.

When the lock elements 840 secure the latch elements 230, the door 200 is in a secured and locked state. As shown in FIG. 8A, the lock elements 230 are unsecured and the door 200 is in an unlocked state. Moreover, the latch elements 230 are clear of the door stops 225 such that the door 200 is also in an unlatched state.

Figure 8B:
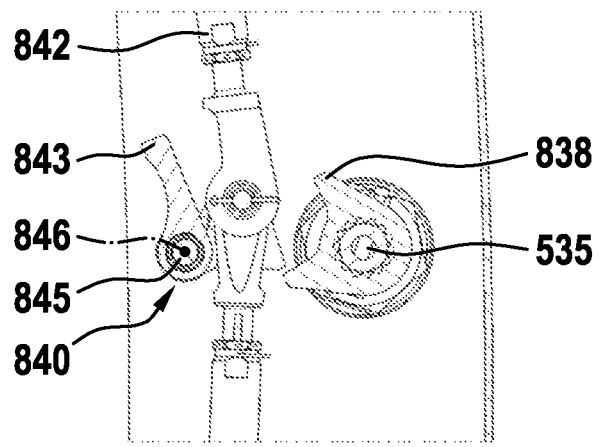
FIG. 8B is a diagram of an illustrative lock element of the illustrative actuating system of FIG. 8A when the door is in an unlocked state in accordance with some embodiments.

FIG. 8B is a diagram of an illustrative lock element 840 of the illustrative actuating system 290 of FIG. 8A when the door 200 is in an unlocked state in accordance with some embodiments.

Illustratively, lock element 840 of FIG. 8A and FIG. 8B may include a lock lever 843 and a lock shaft 845 that is drivable to rotate around an associated lock shaft rotation axis 846. The lock lever 843 may be non-rotatably attached to the lock shaft 845 and perform a rotation around the lock shaft rotation axis 846 in response to the lock shaft 845 performing a rotation around the lock shaft rotation axis 846.

If desired, in an alternative embodiment, the lock shaft 845 may be non-rotatable around the lock shaft rotation axis 846 and the lock lever 843 may be rotatably attached to the lock shaft 845 (e.g., via a bearing) and be drivable to rotate around the lock shaft 845 and the lock shaft rotation axis 846.

By way of example, the actuating system 290 may include a lock operating mechanism 844 that connects the lock shaft 845 with the central drive shaft 260. For example, lock operating mechanism 844 may include rods 841, 842 that connect the lock shaft 845 with the central drive shaft 260.

If desired, the actuating system 290 may include at least one lock counterpart 838 that interacts with the lock lever 843 to limit the rotation of the latch element 230 around the latch shaft rotation axis 636. For example, the lock counterpart 838 may interact with the lock lever 843 to prevent rotation of the latch element 230 around the latch shaft rotation axis 636 when the door 200 is in a secured and locked state.

Figure 8C:
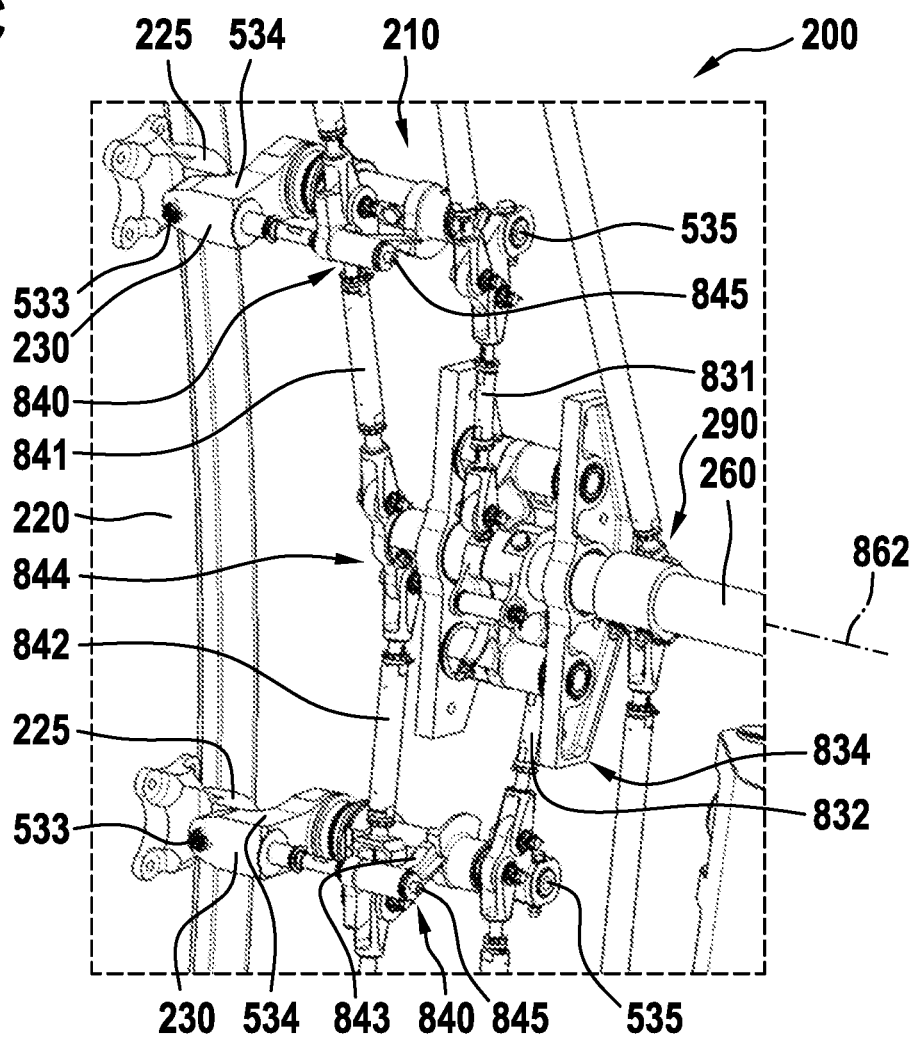
FIG. 8C is a diagram of the illustrative door with the illustrative actuating system of FIG. 8A when the door is in a secured and locked state in accordance with some embodiments.

FIG. 8C is a diagram of the illustrative door 200 with the illustrative actuating system 290 of FIG. 8A when the door 200 is in a secured and locked state in accordance with some embodiments. In the secured and locked state, the latch elements 230 engage with the associated door stops 225 to latch the door leaf 210, and the lock elements 840 secure the associated latch elements 230 such that the door 200 is in the secured and locked state.

Illustratively, compared to FIG. 8A, the lower latch element 230 may have rotated with the lower latch shaft 535 in a clockwise direction around the associated latch shaft rotation axis to engage with the associated lower door stop 225, and the upper latch element 230 may have rotated with the upper latch shaft 535 in a counterclockwise direction around the associated latch shaft rotation axis to engage with the associated upper door stop 225.

Figure 8D:
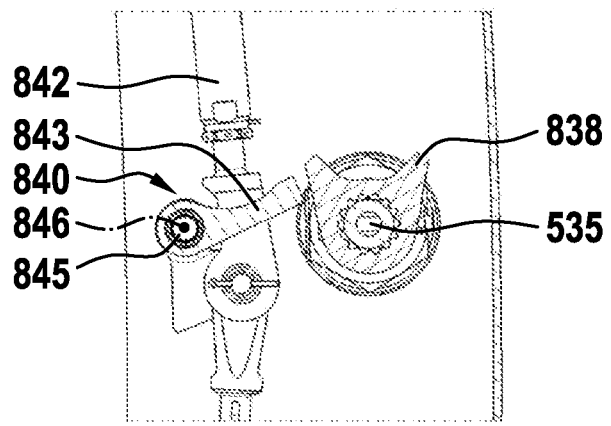
FIG. 8D is a diagram of an illustrative lock element of the illustrative actuating system of FIG. 8C when the door is in the secured and locked state in accordance with some embodiments.

FIG. 8D is a diagram of the illustrative lock element 840 of the illustrative actuating system 290 of FIG. 8C when the door 200 is in the secured and locked state in accordance with some embodiments. Compared to FIG. 8B, the latch shaft 535 of FIG. 8D has performed a rotation in clockwise direction around the latch shaft rotation axis.

Compared to FIG. 8B, the latch element 230 that is non-rotatably attached to the latch shaft 535 has performed a rotation in clockwise direction in response to the latch shaft 535 performing a rotation in clockwise direction around the latch shaft rotation axis.

If desired, the at least one lock counterpart 838 may be non-rotatably attached to the latch shaft 535. Thus, the at least one lock counterpart 838 may have performed a rotation in clockwise direction in response to the latch shaft 535 performing a rotation in clockwise direction around the latch shaft rotation axis.

Figure 9A:
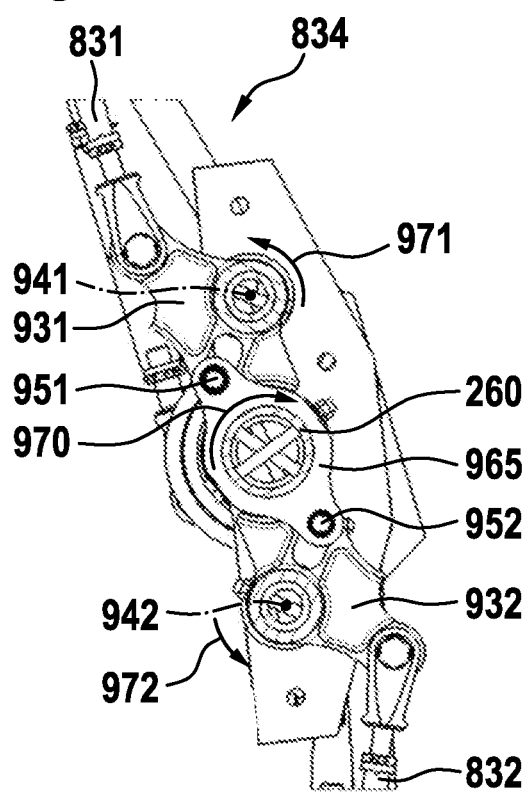
FIG. 9A is a diagram of an illustrative latch operating mechanism when the door is in an unlatched state in accordance with some embodiments.

FIG. 9A is a diagram of an illustrative portion of a latch operating mechanism 834 that connects a central drive shaft 260 to upper and lower rods 831, 832, respectively. Illustratively, the door that includes the latch operating mechanism 834 is in an unlatched state. Thus, the state of latch operating mechanism 834 of FIG. 9A may correspond to the state of latch operating mechanism 834 of FIG. 8A.

As shown in FIG. 9A, the latch operating mechanism 834 may include upper and lower drive levers 931, 932. If desired, the latch operating mechanism 834 may include a carrier 965 that is non-rotatably attached to the central drive shaft 260.

The upper and lower drive levers 931, 932 may be connected to the central drive shaft 260. For example, upper and lower driving bolts 951, 952, may connect upper and lower drive levers 931, 932 with carrier 965, respectively, and thereby to the central drive shaft 260.

During a latching operation of the door, central drive shaft 260 may rotate in clockwise direction (i.e., in rotation direction 970). Thus, carrier 965, that is non-rotatably attached to the central drive shaft 260, may rotate with the central drive shaft 260 in rotation direction 970.

As a result, upper and lower drive levers 931, 932, that are connected to carrier 965 with upper and lower driving bolts 951, 952, respectively, may perform a counterclockwise rotation in rotation direction 971, 972 around drive lever rotation axes 941, 942, respectively. In response to the counterclockwise rotation in rotation direction 971, 972 around drive lever rotation axes 941, 942, the upper and lower drive levers 931, 932 may pull the upper and lower rods 831, 832 towards the central drive shaft 260.

In response to the upper rod 831 being pulled downwards towards the central drive shaft 260, the upper latch shaft 535 of FIG. 8A may perform a counterclockwise rotation around the latch shaft rotation axis and the lower latch shaft 535 a clockwise rotation around the latch shaft rotation axis such that respective upper and lower latch elements 230 rotate from the position shown in FIG. 8A to the position shown in FIG. 8C.

Figure 9B:
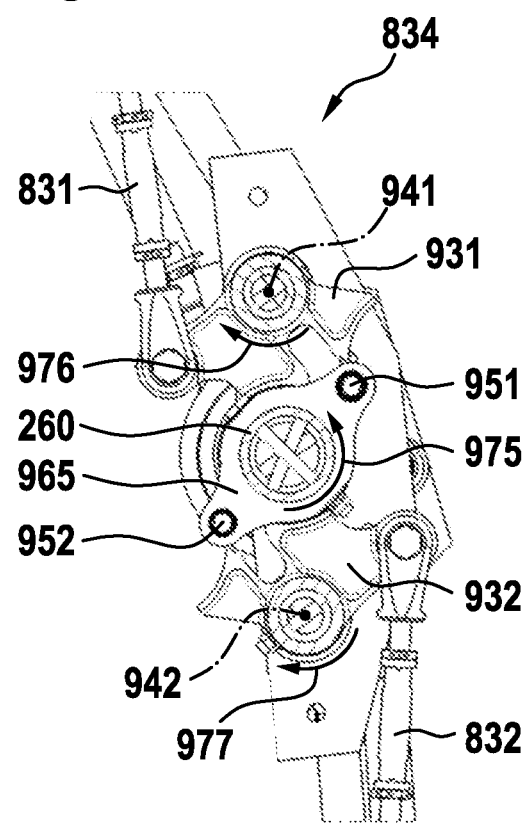
FIG. 9B is a diagram of the illustrative latch operating mechanism of FIG. 9A when the door is in a latched state in accordance with some embodiments.

At the end of the latching operation, the illustrative portion of the latch operating mechanism 834 of FIG. 9A is in the state shown in FIG. 9B.

FIG. 9B is a diagram of the illustrative latch operating mechanism of FIG. 9A when the door is in a latched state in accordance with some embodiments. Illustratively, the state of latch operating mechanism 834 of FIG. 9B may correspond to the state of latch operating mechanism 834 of FIG. 8C.

During an unlatching operation of the door, central drive shaft 260 may rotate in counterclockwise direction (i.e., in rotation direction 975). Thus, carrier 965, that is non-rotatably attached to the central drive shaft 260, may rotate with the central drive shaft 260 in rotation direction 975.

As a result, upper and lower drive levers 931, 932, that are connected to carrier 965 with upper and lower driving bolts 951, 952, respectively, may perform a clockwise rotation in rotation direction 976, 977 around drive lever rotation axes 941, 942, respectively. In response to the clockwise rotation in rotation direction 976, 977 around drive lever rotation axes 941, 942, the upper and lower drive levers 931, 932 may push the upper and lower rods 831, 832 away from the central drive shaft 260.

In response to the upper rod 831 being pushed upwards and away from the central drive shaft 260, the upper latch shaft 535 of FIG. 8C may perform a clockwise rotation around the latch shaft rotation axis and the lower latch shaft 535 a counterclockwise rotation around the latch shaft rotation axis such that respective upper and lower latch elements 230 rotate from the position shown in FIG. 8C to the position shown in FIG. 8A.

At the end of the latching operation, the illustrative portion of the latch operating mechanism 834 of FIG. 9B is in the state shown in FIG. 9A.

It should be noted that modifications to the above described embodiments are within the common knowledge of the person skilled in the art and, thus, also considered as being part of the present disclosure.

For example, the latch elements 230 of FIG. 1B are shown to be on the left side 222 and the right side 224 of door leaf 210. However, latch elements 230 may also/or instead be installed on the upper side 226 and on the lower side 228 of door leaf 210, if desired.

Furthermore, latch element 230 of FIGS. 4A and 4B has an L-shaped body 5. Latch element 230 is further shown with one connection with door leaf 210. However, the body 534 of latch element 230 may be U-shaped or bracket-shaped and have more than one connection with door leaf 210, if desired.

Additionally, guide rail 320 of FIGS. 4A to 4C is shown with a protrusion 323. However, guide rail 320 of FIGS. 4A to 4C may have a wave-shape as shown in FIG. 3B.

Moreover, the illustrative lock element 840 of FIG. 8B and FIG. 8D show the lower lock element 840 of FIG. 8A and FIG. 8C, respectively. However, for the upper lock element 840 of FIG. 8A and FIG. 8C, latch shaft 535 may perform a rotation in counterclockwise direction around the latch shaft rotation axis. As a result, the latch element 230 that is non-rotatably attached to the latch shaft 535 has performed a rotation in counterclockwise direction in response to the latch shaft 535 performing a rotation in counterclockwise direction around the latch shaft rotation axis, and the at least one lock counterpart 838 may have performed a rotation in counterclockwise direction in response to the latch shaft 535 performing a rotation in clockwise direction around the latch shaft rotation axis.

REFERENCE LIST

100 aircraft
102 aircraft airframe, fuselage
103a aircraft passenger cabin
103b aircraft cargo deck
103c aircraft flight deck
104 aircraft door
104a, 104b, 104c, 104d cabin access doors
104e cargo deck access door
200 door
202 first environment, inside of a pressurized cabin
204 second environment, outside of a pressurized cabin
210 door leaf
220 door frame
221 roller
225 door stop
230 latch element
231, 232 rod
250 drive shaft actuating system, door opening mechanism
260 central drive shaft
265 rubber seal
270 beam, door leaf structure
275 inward-moving drive system
277 puller shaft
278 puller shaft rotation axis
279 rod to puller shaft
290 actuating system
302, 304 pressure
310 stopper nose
315 angled stop surface
317 angle
320 puller
322 guide rail
323 protrusion
324 wave-shaped profile
332 lever
340 door leaf movement
533 door stop screw
534 body of latch element
535 latch shaft
636 latch shaft rotation axis
638 latch support
702, 704 pressure
731 door stop screw rotation circle
733 no clearance
734 clearance
831, 832 rod
834 latch operating mechanism
838 lock counterpart
840 lock element
841, 842 rod
843 lock lever
844 lock operating mechanism
845 lock shaft
846 lock shaft rotation axis
862 central drive shaft rotation axis
931, 932 drive lever
941, 942 drive lever rotation axis
951, 952 driving bolt
965 carrier
970, 975 central drive shaft rotation direction
971, 972, 976, 977 drive lever rotation direction

What is claimed is:

1. An aircraft door that is adapted to separating a first environment with a first air pressure from a second environment with a second air pressure, comprising:
   a door frame that comprises:
   a door stop that protrudes from the door frame, and a roller that protrudes from the door frame;
   a door leaf that is adapted to closing the door frame; and an actuating system that is mounted to the door leaf and comprises:
a latch element that is adapted to engaging with the door stop to latch the door leaf, wherein the latch element is pushed against the door stop when the door is in a latched state and the first air pressure is greater than the second air pressure; and
an inward-moving drive system that comprises:
a puller shaft that is drivable to rotate around an associated puller shaft rotation axis, and
a puller that is non-rotatably attached to the puller shaft and comprises:
a guide rail that moves along the roller during a rotation of the puller in response to a rotation of the puller shaft around the puller shaft rotation axis such that the puller moves the door leaf in direction of the first environment thereby disengaging the latch element from the door stop and enabling a transition of the door from the latched to an unlatched state, and
a stopper nose that is pushed against the roller when the door is in the latched state and the first air pressure is smaller than or equal to the second air pressure.

2. The aircraft door of claim 1 wherein the stopper nose has an angled stop surface that is in contact with the roller when the door is in the latched state and the first air pressure is smaller than or equal to the second air pressure.

3. The aircraft door of claim 1 wherein the guide rail disengages from the roller when the door reaches the unlatched state.

4. The aircraft door of claim 1 wherein the guide rail has a protrusion, and wherein the puller moves the door leaf in direction of the first environment when the roller moves over the protrusion.

5. The aircraft door of claim 1 wherein the guide rail has a wave-shaped profile such that the puller moves the door leaf in direction of the first environment when the roller moves over the wave-shaped profile.

6. The aircraft door of claim 1 further comprising: a rubber seal that is mounted to a contour of the door leaf and prevents an equalization between the first and second air pressures.

7. The aircraft door of claim 1 wherein the actuating system further comprises:
a lock element that is adapted to securing the latch element such that the door is in a secured and locked state.

8. The aircraft door of claim 7 wherein the lock element further comprises:
a lock lever and
a lock shaft that is drivable to rotate around an associated lock shaft rotation axis, wherein the lock lever is non-rotatably attached to the lock shaft and performs a rotation around the lock shaft rotation axis in response to the lock shaft performing a rotation around the lock shaft rotation axis.

9. The aircraft door of claim 8 wherein the actuating system further comprises:
a latch shaft that is drivable to rotate around an associated latch shaft rotation axis, wherein the latch element is non-rotatably attached to the latch shaft and performs a rotation around the latch shaft rotation axis in response to the latch shaft performing a rotation around the latch shaft rotation axis.

10. The aircraft door of claim 9 wherein the actuating system further comprises:

at least one lock counterpart that interacts with the lock lever to limit the rotation of the latch element around the latch shaft rotation axis.

11. The aircraft door of claim 9 wherein the actuating system further comprises:
a central drive shaft that is drivable to rotate around an associated central drive shaft rotation axis;
a latch operating mechanism that connects the latch shaft with the central drive shaft; and
a lock operating mechanism that connects the lock shaft with the central drive shaft.

12. The aircraft door of claim 11 wherein the latch operating mechanism further comprises:
first and second drive levers that are connected to the central drive shaft and drivable to rotate around associated first and second drive lever rotation axes, wherein the first and second drive levers rotate in a counterclockwise direction in response to the central drive shaft rotating in a clockwise direction.

13. The aircraft door of claim 12 wherein the latch operating mechanism further comprises:
first and second rods that are fixedly attached to the respective first and second drive levers, wherein the first and second rods are pulled towards the central drive shaft in response to the first and second drive levers rotating in the counterclockwise direction.

14. The aircraft door of claim 1 wherein the latch element further comprises:
a door stop screw that is adjustable in its axial direction and interacts with the door stop when the door is in the latched state.

15. An aircraft comprising a door adapted to separating a first environment with a first air pressure from a second environment with a second air pressure, the door comprising:
a door frame comprising:
a door stop that protrudes from the door frame, and
a roller that protrudes from the door frame;
a door leaf that is adapted to closing the door frame; and
an actuating system that is mounted to the door leaf and comprises:
a latch element that is adapted to engaging with the door stop to latch the door leaf, wherein the latch element is pushed against the door stop when the door is in a latched state and the first air pressure is greater than the second air pressure; and
an inward-moving drive system that comprises:
a puller shaft that is drivable to rotate around an associated puller shaft rotation axis, and
a puller that is non-rotatably attached to the puller shaft and comprises:
a guide rail that moves along the roller during a rotation of the puller in response to a rotation of the puller shaft around the puller shaft rotation axis such that the puller moves the door leaf in direction of the first environment thereby disengaging the latch element from the door stop and enabling a transition of the door from the latched to an unlatched state, and
a stopper nose that is pushed against the roller when the door is in the latched state and the first air pressure is smaller than or equal to the second air pressure.

16. The aircraft door of claim 1 wherein the actuating system further comprises:

a lock element that is adapted to securing the latch element such that the door is in a secured and locked state.

17. The aircraft door of claim 1 wherein the latch element further comprises:
a door stop screw that is adjustable in its axial direction and interacts with the door stop when the door is in the latched state.

18. AAn aircraft door adapted to separating a first environment with a first air pressure from a second environment with a second air pressure, the door comprising:
a door frame having a door stop protruding from the door frame, and a roller protruding from the door frame;
a door leaf adapted to closing the door frame; and
an actuating system mounted to the door leaf, the actuating system comprising:
a latch adapted to engage with the door stop to latch the door leaf, wherein the latch is pushed against the door stop when the door is in a latched state and the first air pressure is greater than the second air pressure; and
an inward-moving drive system comprising:
a puller shaft drivable to rotate around an associated puller shaft rotation axis, and
a puller non-rotatably attached to the puller shaft, the puller comprising:
a guide rail moveable along the roller during rotation of the puller in response to rotation of the puller shaft around the puller shaft rotation axis such that the puller moves the door leaf in direction of the first environment thereby disengaging the latch from the door stop and enabling a transition of the door from the latched to an unlatched state, and
a stopper nose pushable against the roller when the door is in the latched state and the first air pressure is smaller than or equal to the second air pressure.

19. The aircraft door of claim 18 wherein the actuating system further comprises:
a lock adapted to securing the latch such that the door is in a secured and locked state.

20. The aircraft door of claim 18 wherein the latch further comprises:
a door stop screw adjustable in its axial direction and interacts with the door stop when the door is in the latched state.

* * * * *